(12) United States Patent
Horng et al.

(10) Patent No.: US 9,887,597 B2
(45) Date of Patent: Feb. 6, 2018

(54) MOTOR WINDING ASSEMBLY

(71) Applicant: Sunonwealth Electric Machine Industry Co., Ltd., Kaohsiung (TW)

(72) Inventors: Alex Horng, Kaohsiung (TW);
Guan-Ming Chen, Kaohsiung (TW);
Li-Yang Lyu, Kaohsiung (TW);
Chang-Yu Lin, Kaohsiung (TW);
Jui-Feng Wang, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 359 days.

(21) Appl. No.: 14/861,771

(22) Filed: Sep. 22, 2015

(65) Prior Publication Data
US 2016/0111928 A1    Apr. 21, 2016

(30) Foreign Application Priority Data
Oct. 16, 2014    (TW) .............................. 103135869 A

(51) Int. Cl.
*H02K 3/26*    (2006.01)
*H02K 5/22*    (2006.01)
*H02K 11/33*    (2016.01)

(52) U.S. Cl.
CPC ............... *H02K 3/26* (2013.01); *H02K 5/225* (2013.01); *H02K 11/33* (2016.01)

(58) Field of Classification Search
CPC ...................................................... H02K 3/26
See application file for complete search history.

(56) References Cited

U.S. PATENT DOCUMENTS

| | | | | |
|---|---|---|---|---|
| 3,096,455 A | * | 7/1963 | Hahn ........................ | H02K 3/26 310/154.06 |
| 3,737,697 A | * | 6/1973 | Kitamori ................... | H02K 3/26 310/207 |
| 4,340,833 A | * | 7/1982 | Sudo ......................... | H02K 3/26 310/207 |
| 4,804,574 A | * | 2/1989 | Osawa ...................... | H02K 3/26 310/184 |

(Continued)

FOREIGN PATENT DOCUMENTS

| | | |
|---|---|---|
| CN | 101895163 A | 11/2010 |
| JP | S59162738 A | 9/1984 |
| TW | I422123 B | 1/2014 |

*Primary Examiner* — Robert W Horn
(74) *Attorney, Agent, or Firm* — Alan D. Kamrath; Kamrath IP Lawfirm, P.A.

(57) ABSTRACT

The present invention provides a motor winding assembly including a flexible base plate and a winding assembly. The flexible base plate includes a plurality of supports. A bridge is connected between adjacent two of the plurality of supports. Each of the plurality of supports has a center, and the flexible base plate has a reference line extending through the centers of the plurality of supports. The bridge is not located on the reference line. The winding assembly includes a plurality of winding units. Each of the plurality of supports is provided with at least one winding unit. An electrical path is located on the bridge between the adjacent two of the plurality of supports and electrically connected to the winding units of the adjacent two of the plurality of supports. In this arrangement, the total length of the flexible base plate is reduced.

17 Claims, 7 Drawing Sheets

(56) References Cited

U.S. PATENT DOCUMENTS

| | | | | |
|---|---|---|---|---|
| 5,644,183 | A * | 7/1997 | Van Loenen | H02K 3/26 310/268 |
| 6,005,324 | A * | 12/1999 | Kim | H02K 21/24 310/179 |
| 8,154,161 | B2 * | 4/2012 | Horng | H02K 21/24 310/268 |
| 8,193,678 | B2 * | 6/2012 | Horng | H02K 3/26 310/208 |
| 8,536,970 | B2 * | 9/2013 | Liang | H02K 3/26 310/208 |
| 9,780,615 | B2 * | 10/2017 | Chen | H02K 3/26 |
| 2013/0049500 | A1 * | 2/2013 | Shan | H02K 3/26 310/71 |
| 2015/0015102 | A1 * | 1/2015 | Wong | H02K 21/24 310/71 |
| 2016/0111928 | A1 * | 4/2016 | Horng | H02K 3/26 310/208 |
| 2016/0126795 | A1 * | 5/2016 | Chen | H02K 5/225 310/68 R |
| 2016/0218577 | A1 * | 7/2016 | Chen | H02K 3/26 |

* cited by examiner

MOTOR WINDING ASSEMBLY

CROSS REFERENCE TO RELATED APPLICATIONS

The application claims the benefit of Taiwan application serial No. 103135869, filed on Oct. 16, 2014, the subject matter of which is incorporated herein by reference.

BACKGROUND OF THE INVENTION

1. Field of the Invention

The present invention generally relates to a motor winding assembly and, more particularly, to a motor winding assembly that can be folded to form a multi-layered winding assembly via the use of a flexible base plate.

2. Description of the Related Art

Please refer to FIG. 1, a conventional motor winding, assembly includes a flexible base plate 91 and a coil assembly 92. The flexible base plate 91 includes a plurality of supports 911 and a plurality of bridges 912. Each bridge 912 is connected between two adjacent supports 911. The coil assembly 92 includes a plurality of winding units 921. Each winding unit 921 is arranged on a respective support 911. As such, the flexible base plate 91 may be folded to stack the supports 911 together, forming a multiple-layered winding assembly of a motor. This simplifies the assembly procedure of the motor and increases the number of turns of the windings. Such a motor winding assembly 9 may be seen in Taiwan Patent No. 1422123.

The conventional motor winding assembly 9 may be arranged in any motor. The plurality of winding units 921 of the motor winding assembly 9 may be electrified to drive a rotor of the motor to rotate.

Moreover, each support 911 of the conventional motor winding assembly has a center "C," and the flexible base plate 91 has a reference line "L" extending through the centers "C" of the supports 911. Since each bridge 912 is located on the reference line "L," it is necessary to maintain a distance "D" between two adjacent supports 911 within which the bridge 912 can be arranged. However, arrangement of the distances "D" results in an increased length of the flexible base plate 91 when the flexible base plate 91 is not folded, thus adversely affecting the miniaturization of the motor and causing waste of material. In addition, the production cost is increased.

SUMMARY OF THE INVENTION

It is therefore the objective of this invention to provide a motor winding assembly which decreases the length of the flexible base plate before folding.

The present invention provides a motor winding assembly including a flexible base plate and a winding assembly. The flexible base plate includes a plurality of supports. A bridge is connected between adjacent two of the plurality of supports. Each of the plurality of supports has a center, and the flexible base plate has a reference line extending through the centers of the plurality of supports. The bridge is not located on the reference line. The winding assembly includes a plurality of winding units. Each of the plurality of supports is provided with at least one of the plurality of winding units of the winding assembly. An electrical path is located on the bridge between the adjacent two of the plurality of supports and electrically connected to the winding units of the adjacent two of the plurality of supports.

In a form shown, the electrical path is electrically connected with an auxiliary electrical path in parallel.

In the form shown, each of the plurality of supports has an assembly hole at the center thereof.

In the form shown, the bridges has a minimal connecting length along a direction parallel to the an extending direction of the reference line. A minimal distance is formed between edges of the adjacent two of the plurality supports along the extending direction of the reference line, and the minimal distance is smaller than the minimal connecting length.

In the form shown, the adjacent two of the plurality of supports are in contact at edges thereof.

In the form shown, each of the plurality of supports comprises a first surface and a second surface opposite to the first surface, and the at least one winding unit of each of the plurality of supports comprises one winding unit arranged on the first surface.

In another form shown, the at least one winding unit of each of the plurality of supports further comprises another winding unit arranged on the second surface.

In the other form shown, each of the plurality of supports has an electrical connecting hole extending through the first and second surfaces thereof, and the two winding units on the first and second surfaces are electrically connected together via the electrical connecting hole.

In the form shown, the plurality of supports is stacked together to form the flexible base plate as a multi-layered winding assembly.

In the form shown, the flexible base plate further comprises a driving circuit portion, and a driving circuit is arranged on the driving circuit portion.

In the form shown, the driving circuit portion is connected between any adjacent two of the plurality of supports. Alternatively, when the amount of the plurality of supports is even, the driving circuit portion is arranged in a central place of the flexible base plate.

In the form shown, the driving circuit portion is arranged on a top side or a bottom side of the multi-layered winding assembly.

In the form shown, the plurality of winding units is electrically connected in parallel, in series, or in both parallel and series.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
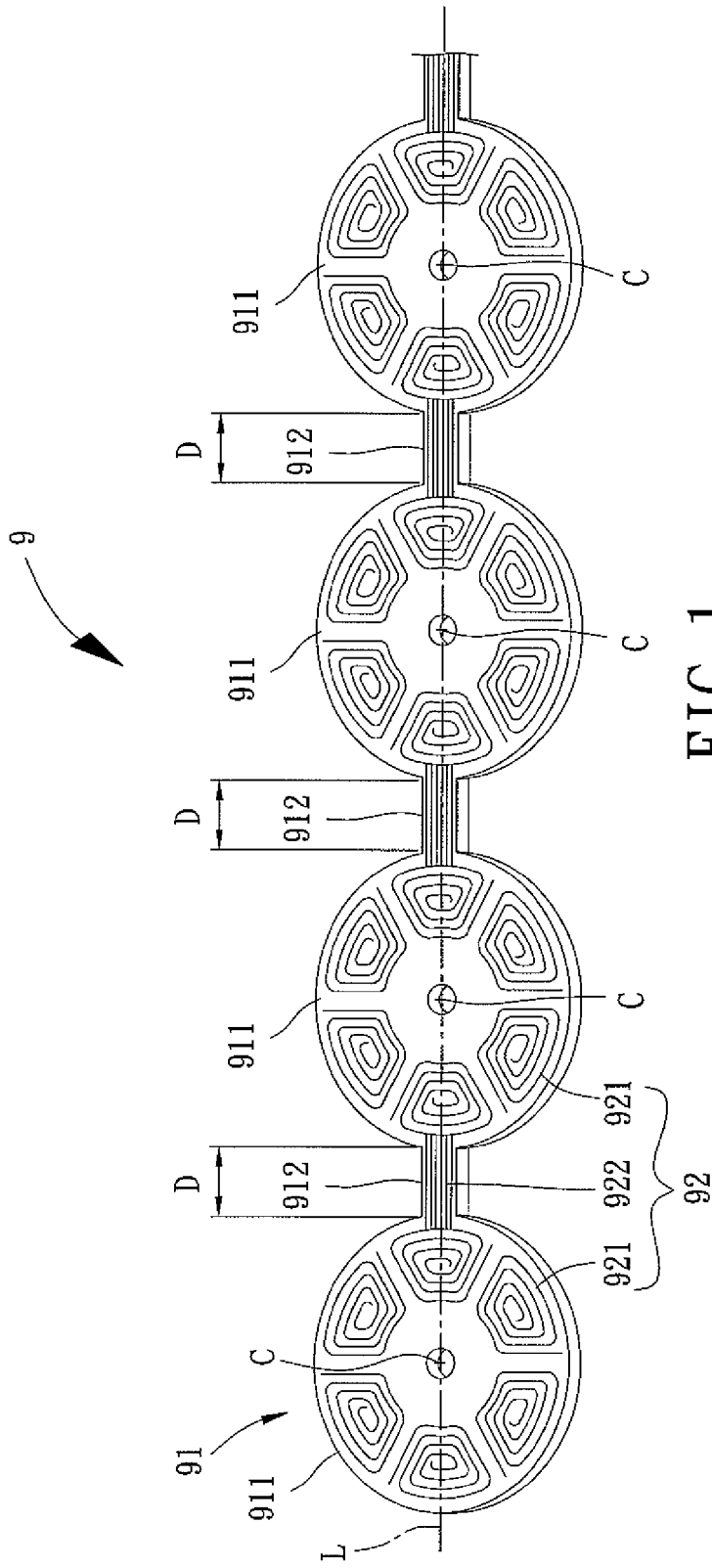
FIG. 1 is a perspective view of a conventional motor winding assembly.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
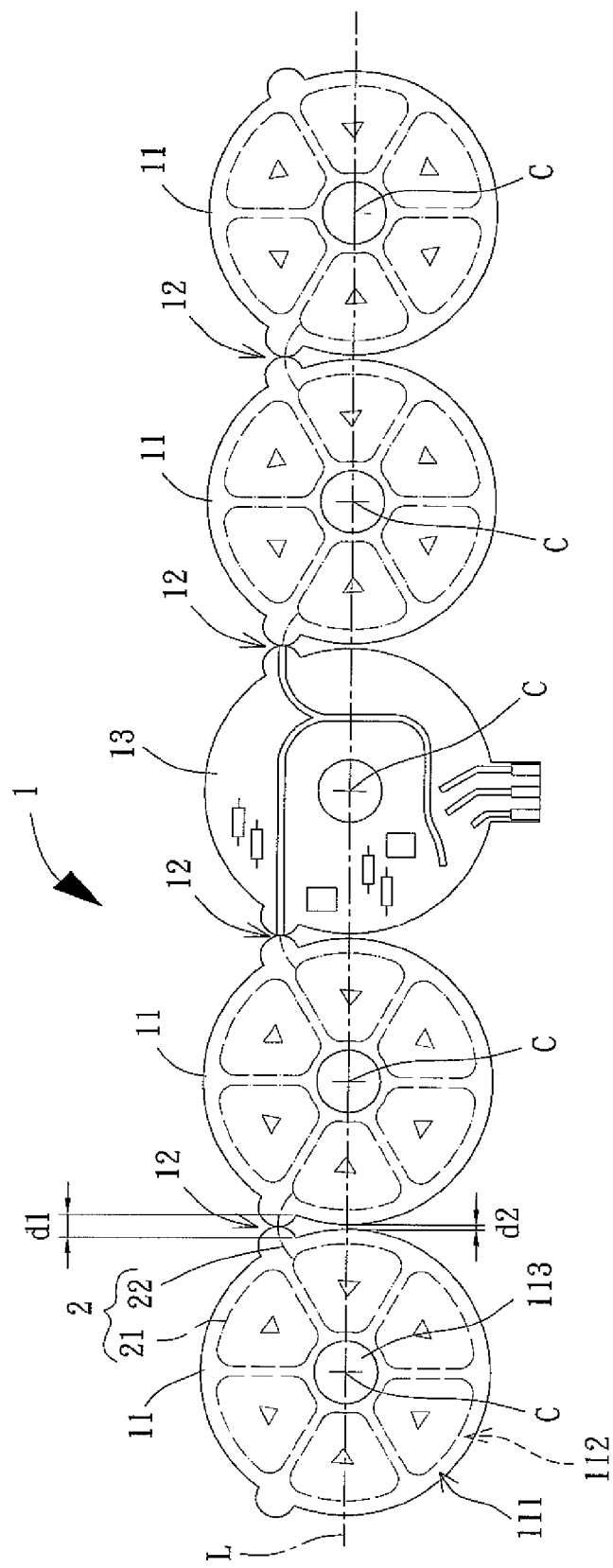
FIG. 2 is a perspective view of a motor winding assembly of the present invention.

Please refer to FIG. 2 showing a motor winding assembly of the present invention, including a flexible base plate 1 and a winding assembly 2. The winding assembly 2 may be arranged on the flexible base plate 1.

The flexible base plate 1 may be a foldable base plate such as a flexible print circuit board (FPCB) or a flexible substrate, which is not limited in the present invention. The flexible base plate 1 includes a plurality of supports 11. A bridge 12 is connected between two adjacent supports 11 in order to sequentially connect the plurality of supports 11 together. The bridge 12 may be in any shape, such as in the form shown in FIGS. 2 and 8, for example. Each support 11 has a center "C," and the flexible base plate 1 has a reference line "L" extending through the centers "C" of the supports 11. The bridge 12 is not located on the reference line "L." As shown in FIG. 2, based on the technical concept disclosed above, the bridge 12 has a minimal connecting length d1 along an extending direction of the reference line "L." In addition, a minimal distance d2 is formed between the peripheries of two adjacent supports 11 along the extending direction of the reference line "L." The minimal distance d2 is smaller than the minimal connecting length d1. According to this arrangement, it is not needed to maintain a large distance between two adjacent supports 11 for arrangement of the bridge 12. Therefore, the peripheries of two adjacent supports 11 may be spaced from each other in a smaller distance, thus reducing the total length of the flexible base plate 1. Moreover, the peripheries of two adjacent supports 11 may abut with each other without having any distance therebetween, which further reduces the total length of the flexible base plate 1.

The winding assembly 2 includes a plurality of winding units 21. Each winding unit 21 may be in the form of a single coil or a plurality of coils. The coils may be formed on the supports 11 by electroforming or printing process, and each winding unit 21 is arranged on a respective support 11. The plurality of winding units 21 may be formed on the plurality of supports 11 by electroforming or layout, and an electrical path 22 is connected between two adjacent winding units 21. Each electrical path 22 is arranged on a respective bridge 12 so that the plurality of winding units 21 can be electrically connected together via the electrical paths 22.

Figure 3:
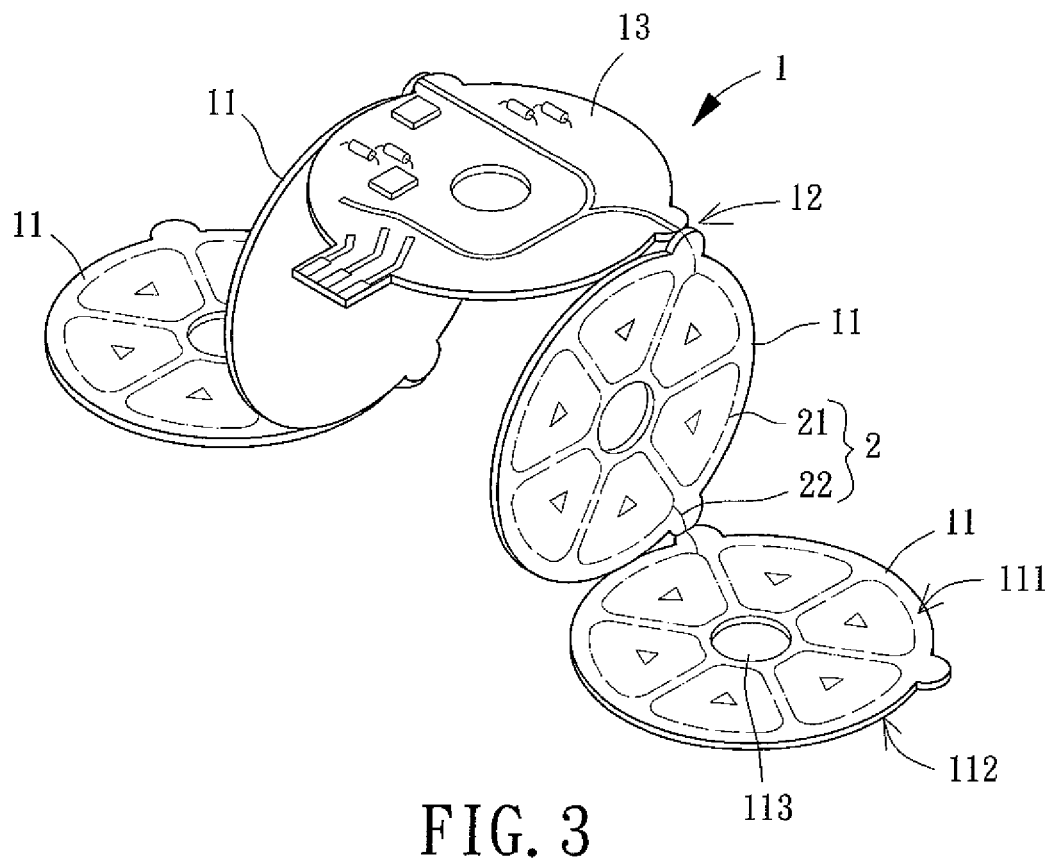
FIG. 3 shows the motor winding assembly of the present invention during a folding procedure.
Figure 4:
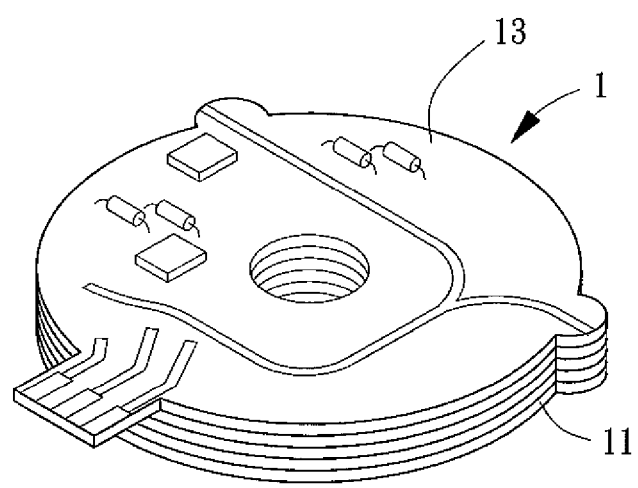
FIG. 4 is a perspective view of a multi-layered winding assembly formed by folding the motor winding assembly of the present invention together.

Please refer to FIGS. 3 and 4, when the motor winding assembly of the present invention is used in a motor, the flexible base plate 1 may be folded via the bridges 12 to stack the plurality of supports 11 together, thus forming a multi-layered winding assembly. The plurality of supports 11 may be pressed or adhered together. As such, the assembly procedure is simplified, and the number of turns of the coil is increased. Additionally, when the winding units 21 on the plurality of supports 11 are electrified, the rotor of the motor is driven to rotate. The principle on how the motor winding assembly drives the rotor to rotate is not described herein, since it can be readily understood by the persons having ordinary skills in the art. Moreover, an insulating layer may be arranged between two adjacent supports 11 to provide an insulating effect.

Figure 5:
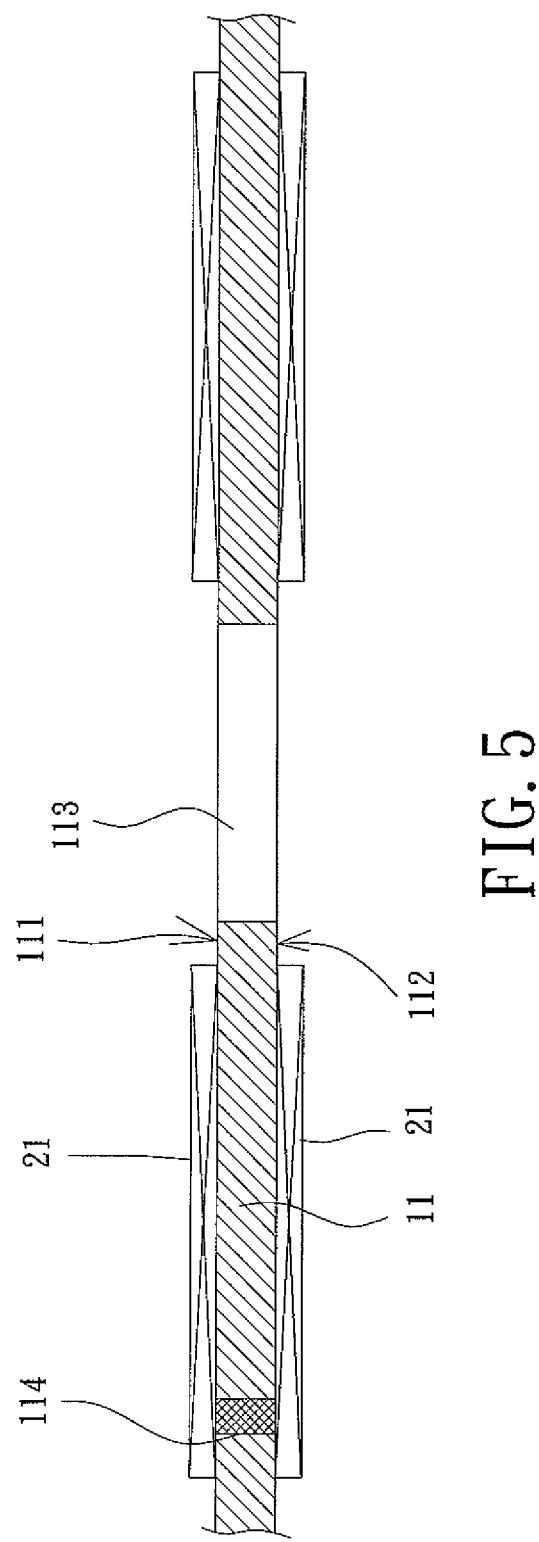
FIG. 5 is a partial, cross sectional view of the motor winding assembly of the present invention.

Please refer to FIGS. 2 and 5, each of the plurality supports 11 of the flexible base plate 1 has a first surface 111 and a second surface 112 opposite to the first surface 111. The winding unit 21 may be arranged on one of the first and second surfaces 111 and 112. Alternatively, both the first and second surfaces 111 and 112 may be respectively provided with a winding unit 21 to increase the numbers of the turns of the coils as well as to provide a customized assembly procedure.

Please refer to FIGS. 2 and 4, an assembly hole 113 may be arranged at the center "C" of each support 11. The assembly hole 113 extends through the first and second surfaces 111 and 112. The assembly hole 113 of the plurality of supports 11 may align with each other when the plurality of supports 11 is stacked together to form the multi-layered winding assembly. As such, the multi-layered winding assembly can be fitted around certain motor components to provide an enhanced engagement effect, such as a shaft tube of the motor.

Please refer to FIG. 5, an electrical connecting hole 114 is arranged on each of the plurality of supports 11 and extends through the first and second surfaces 111 and 112. The winding units 21 on the first and second surfaces 111 and 112 are electrically connected together via the electrical connecting hole 114, providing a convenient connection between the winding units 21.

Please refer to FIGS. 2, 3 and 4, the flexible base plate 1 further includes a driving circuit portion 13. The driving circuit potion 13 may be arranged on one of the supports 11 or may be connected to the supports 11. The driving circuit portion 13 includes a driving circuit. Additionally, the driving circuit may be integrated with the winding units 2, thus providing a convenient assembly. The arrangement of the driving circuit portion 13 is not limited in the present invention. For example, the driving circuit portion 13 may be connected between any two adjacent supports 11. Alternatively, when the amount of the plurality of supports 11 is even, the driving circuit portion 13 may be arranged in a central place of the flexible base plate 1. As shown in FIG. 2, when the flexible base plate 1 includes four supports 11, two supports 11 are connected to one side of the driving circuit portion 13, and the other two supports 11 are connected to the opposite side of the driving circuit portion 13. Thus, the driving circuit portion 13 is arranged in the central place of the flexible base plate 1 to reduce the layout complexity. Additionally, when the flexible base plate 1 is folded via the bridges 12 to stack the plurality of supports 11 together to form the multi-layered winding assembly, the driving circuit portion 13 may be arranged on a top side of the multi-layered winding assembly as shown in FIG. 4. Alternatively, the driving circuit portion 13 may be arranged on a bottom side of the multi-layered winding assembly. However, it is not taken as a limited sense.

Figure 6:
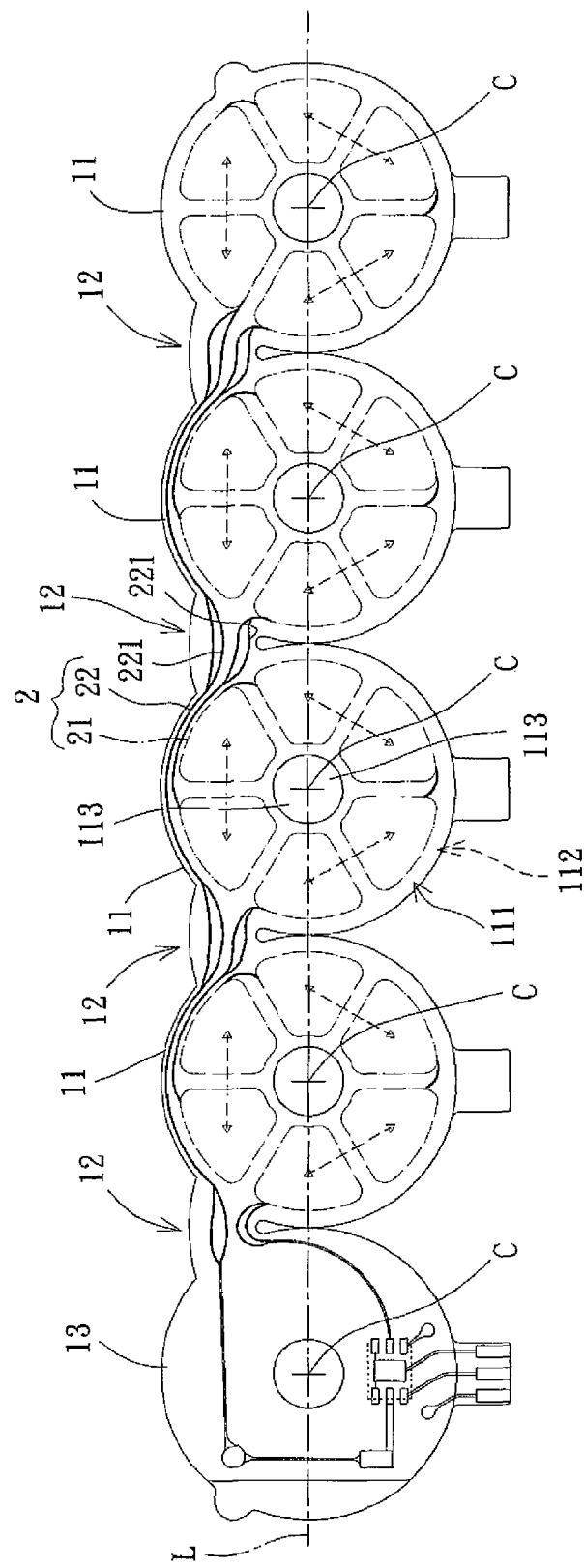
FIG. 6 shows the motor winding assembly of the present invention where the winding units thereof are electrically connected in series.

Please refer to FIG. 6, the portion of the electrical path 22 that is arranged on the respective bridge 12 of the flexible base plate 1 may be electrically connected with an auxiliary electrical path 221 in parallel. The auxiliary electrical path 221 is provided to maintain the electrical connection between the winding units 21 when the electrical path 22 breaks during the folding process of the flexible base plate 1. Thus, the safety of the motor winding assembly is improved.

Figure 7:
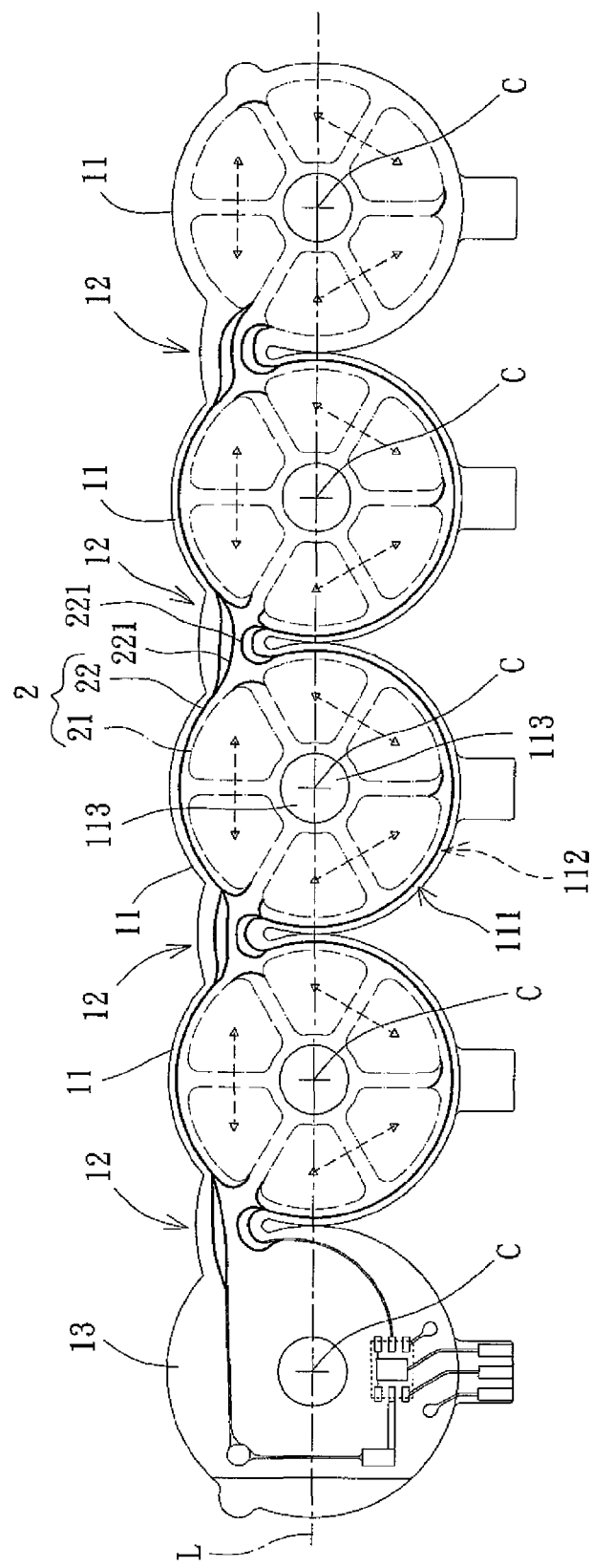
FIG. 7 shows the motor winding assembly of the present invention where the winding units thereof are electrically connected in parallel.
Figure 8:
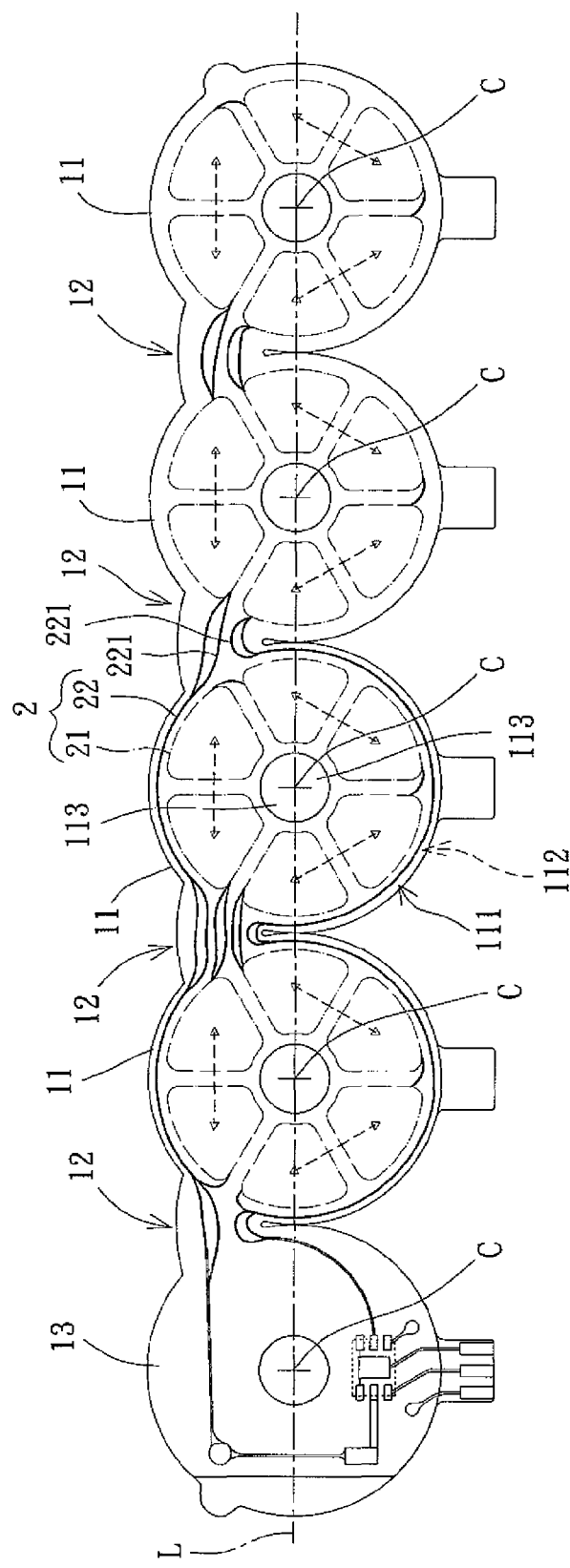
FIG. 8 shows the motor winding assembly of the present invention where the winding units thereof are electrically connected in parallel and series.

Furthermore, the winding units 21 on the supports 11 may be electrically connected to each other in series, in parallel or in both series and parallel. As shown in FIG. 6, the winding units 21 of the supports 11 are electrically connected in series. The winding units 21 shown in FIG. 7 are electrically connected in parallel. With reference to FIG. 8, the winding units 21 of the supports 11 are electrically connected in both series and parallel.

As a conclusion, since the bridge 12 is misaligned with the reference line "L," it is not needed to maintain a large distance between two adjacent supports 11 for arrangement of the bridge 12. As such, the peripheries of two adjacent supports 11 may be spaced from each other in a small distance or may abut with each other, thus efficiently reducing the total length of the flexible base plate 1. In this arrangement, it is easier to achieve the miniaturization of the motor, and the cost of the raw material is reduced at the same time.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A motor winding assembly comprising:
    a flexible base plate comprising a plurality of supports, wherein a bridge is connected between adjacent two of the plurality of supports, wherein each of the plurality of supports has a center, wherein the flexible base plate has a reference line extending through the centers of the plurality of supports, and wherein the bridge is not located on the reference line; and
    a winding assembly comprising a plurality of winding units, wherein each of the plurality of supports is provided with at least one of the plurality of winding units of the winding assembly, wherein an electrical path is located on the bridge between the adjacent two of the plurality of supports and electrically connected to the winding units of the adjacent two of the plurality of supports.

2. The motor winding assembly as claimed in claim 1, wherein the electrical path is electrically connected with an auxiliary electrical path in parallel.

3. The motor winding assembly as claimed in claim 1, wherein each of the plurality of supports has an assembly hole at the center thereof.

4. The motor winding assembly as claimed in claim 1, wherein the bridges has a minimal connecting length along an extending direction of the reference line, wherein a minimal distance is formed between edges of the adjacent two of the plurality supports along the extending direction of the reference line, and wherein the minimal distance is smaller than the minimal connecting length.

5. The motor winding assembly as claimed in claim 1, wherein the adjacent two of the plurality of supports are in contact at edges thereof.

6. The motor winding assembly as claimed in claim 1, wherein each of the plurality of supports comprises a first surface and a second surface opposite to the first surface, and wherein the at least one winding unit of each of the plurality of supports comprises one winding unit arranged on the first surface.

7. The motor winding assembly as claimed in claim 6, wherein the at least one winding unit of each of the plurality of supports further comprises another winding unit arranged on the second surface.

8. The motor winding assembly as claimed in claim 7, wherein each of the plurality of supports has an electrical connecting hole extending through the first and second surfaces thereof, and wherein the two winding units on the first and second surfaces are electrically connected together via the electrical connecting hole.

9. The motor winding assembly as claimed in claim 1, wherein the plurality of supports is folded and stacked together to form the flexible base plate as a multi-layered winding assembly.

10. The motor winding assembly as claimed in claim 9, wherein the flexible base plate further comprises a driving circuit portion, and wherein a driving circuit is arranged on the driving circuit portion.

11. The motor winding assembly as claimed in claim 10, wherein the driving circuit portion is connected between any adjacent two of the plurality of supports.

12. The motor winding assembly as claimed in claim 10, when the amount of the plurality of supports is even, the driving circuit portion is arranged in a central place of the flexible base plate.

13. The motor winding assembly as claimed in claim 10, wherein the driving circuit portion is arranged on a top side of the multi-layered winding assembly.

14. The motor winding assembly as claimed in claim 10, wherein the driving circuit portion is arranged on a bottom side of the multi-layered winding assembly.

15. The motor winding assembly as claimed in claim 1, wherein the plurality of winding units is electrically connected in parallel.

16. The motor winding assembly as claimed in claim 1, wherein the plurality of winding units is electrically connected in series.

17. The motor winding assembly as claimed in claim 1, wherein the plurality of winding units is electrically connected in parallel and series.

* * * * *